United States Patent [19]

Adams, Jr.

[11] 4,035,092

[45] July 12, 1977

[54] DUAL BREAKING STRENGTH WEAK LINK

[76] Inventor: Leland D. Adams, Jr., 38 Vista Drive, Kentfield, Calif. 94904

[21] Appl. No.: 594,723

[22] Filed: July 10, 1975

Related U.S. Application Data

[63] Continuation of Ser. No. 476,845, June 6, 1974, abandoned.

[51] Int. Cl.² .......................................... F16D 9/00
[52] U.S. Cl. ................... 403/2; 403/393; 403/388; 403/182; 9/33; 285/2
[58] Field of Search ............ 403/2, 393, 388, 408, 403/180, 182, 339, 340; 9/33, 9; 114/217; 64/28 R; 24/201 TR, 201 LP; 285/2, 3, 4; 85/61; 74/524

[56] References Cited

U.S. PATENT DOCUMENTS

| 869,443 | 10/1907 | Lund | 85/61 UX |
|---|---|---|---|
| 1,317,932 | 10/1919 | Metcalfe, Sr. | 403/393 X |
| 3,362,290 | 1/1968 | Carr et al. | 285/3 X |
| 3,534,418 | 10/1970 | Adams, Jr. | 9/33 |
| 3,593,776 | 7/1971 | Williamson | 64/28 R X |
| 3,602,065 | 8/1971 | Ratcliff | 74/524 |

FOREIGN PATENT DOCUMENTS

| 1,119,434 | 4/1956 | France | 85/61 |

Primary Examiner—Andrew V. Kundrat
Attorney, Agent, or Firm—Flehr, Hohbach, Test, Albritton & Herbert

[57] ABSTRACT

A weak link for securing a life raft painter to a vessel in such a manner that, upon sinking of the vessel, the life raft in its container floats toward the surface to extend the painter its full length. The buoyant force of the raft and container activate a raft inflation mechanism and the increased buoyant force of the inflated raft breaks the weak link and frees the raft from the vessel. In addition, the dual strength weak link can, with a force significantly less than the buoyant force of the inflated raft, be broken manually such that the raft may be freed from the vessel prior to its actual sinking.

5 Claims, 3 Drawing Figures

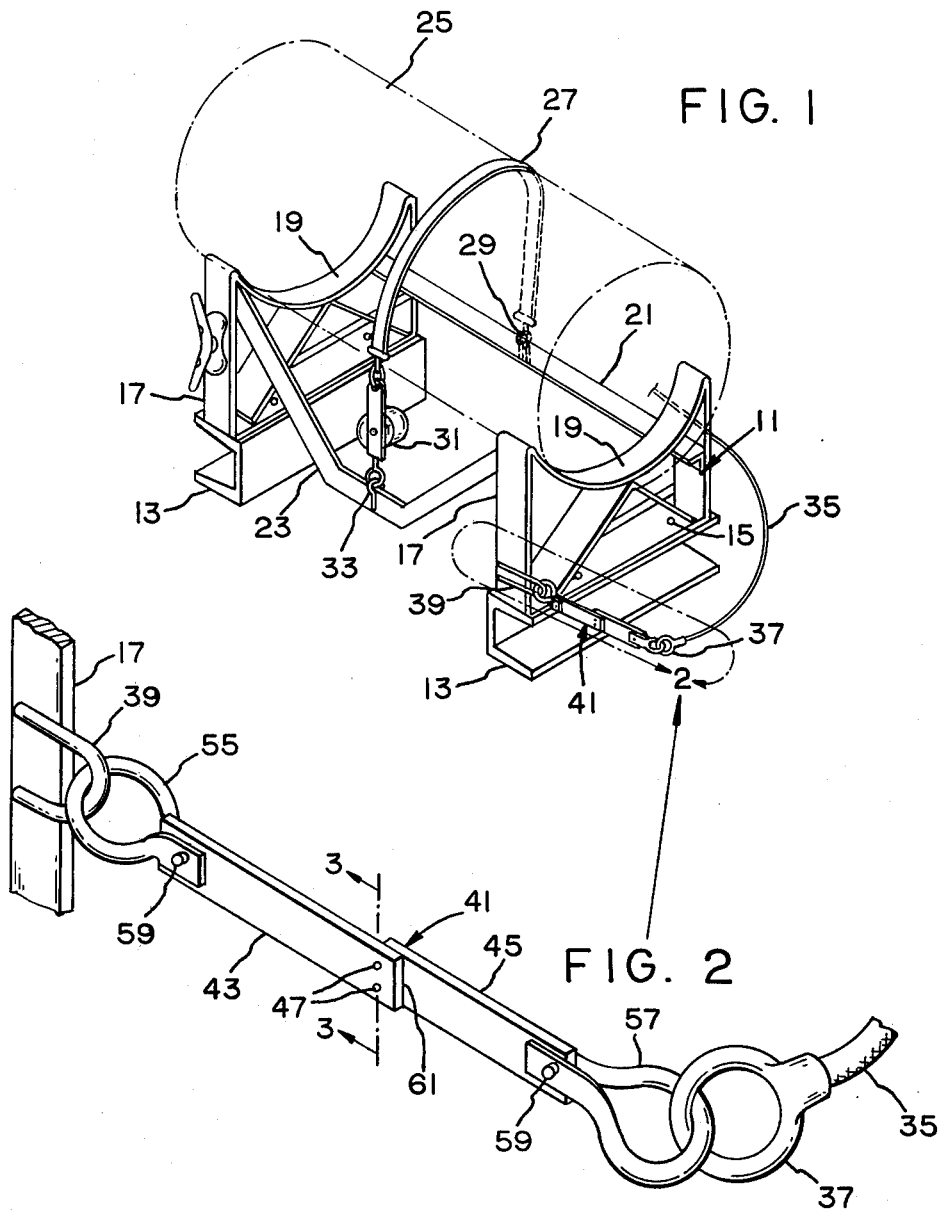
FIG. 1
FIG. 2
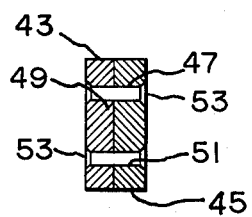
FIG. 3

DUAL BREAKING STRENGTH WEAK LINK

This is a continuation, of application Ser. No. 476,845 filed June 6, 1974, now abandoned.

BACKGROUND OF THE INVENTION

It has for some time been normal practice to secure inflatable life rafts on ships and other vessels in such a manner that the deflated raft is retained within a container on the vessel and the container, in turn, is secured to the vessel by means of a mechanism which releases in response to the hydrostatic pressure which results when the vessel sinks. The container is held to the vessel not only by the hydrostatic release but also by a painter which is secured to the contained raft and, when fully extended and forcefully pulled from the container, actuates a gas cylinder to inflate the raft and burst open the container.

The painter secured to the raft must be sufficiently strong to secure the raft to the vessel despite high seas and winds. Experience has shown that the painter and its connection to the raft must be so strong that it can, in certain instances, actually pull the raft down with the sinking vessel so that, although completely and automatically released and opened, the raft would be unuseable and carried to the bottom in its inflated condition with the sinking vessel.

In order to overcome this problem the painters have in the past been made of a rope having a breaking strength less than the buoyant force of the inflated raft but greater than that necessary to actuate the gas cylinder and inflate the raft. The breaking strength of such a painter, of course, may vary with the size of the raft but in most instances the breaking strength is on the order of several hundred pounds and consequently, when it is desired to release the raft manually the painter cannot easily be separated from the vessel unless there is some tool available for cutting it.

Moreover, the use of a painter having a specific breaking strength is not always satisfactory since knots which may be formed in the painter either intentionally or unintentionally drastically reduce the breaking strength. In some instances the strength of a knotted painter may be so reduced that the painter breaks without actuating the raft inflation mechanism. While it is possible to overcome this difficulty by manually actuating the inflation mechanism, this is difficult once the raft container and the prospective raft occupant are in the water. It is, of course, even more difficult at night time since the container, unlike the inflated raft, does not ordinarily include a self-starting beacon light such that the prospective raft occupant may find the raft.

SUMMARY OF THE INVENTION AND OBJECTS

The invention incorporated herein is a weak link having a predetermined tension strength which is employed when the raft is released and tension is applied by the buoyant force of the inflated raft. In such an instance the breaking strength is relatively large, i.e. strong enough to secure the raft to the vessel while afloat but still not so strong as to pull the inflated raft down with the sinking vessel. On the other hand, the weak link is formed in such a manner that it may be easily broken manually without the use of any tools and with a force substantially less than the buoyant force of the inflated raft.

It is, therefore, an object of this invention to provide a dual breaking strength weak link suitable for use in securing a life raft to a vessel.

It is a more particular object of this invention to provide a dual breaking strength weak link such that the two strengths can be accurately predetermined and permanently maintained.

BRIEF DESCRIPTION OF THE DRAWING

FIG. 1 is a perspective view of a life raft container shown in its cradle and including a painter secured to the cradle by means of a dual breaking strength weak link in accordance with the invention;

FIG. 2 is a perspective view taken along the line 2—2 of FIG. 1 and showing the dual breaking strength weak link in detail; and FIG. 3 is a sectional view taken along the lines 3—3 of FIG. 2.

DESCRIPTION OF THE PREFERRED EMBODIMENT

Referring to FIG. 1 there is shown a cradle 11 secured to channel members 13 by means of bolts 15. The channel members 13, in turn, are securely fastened to the deck, or other fixed structure, of a vessel by welding, bolts, or any other convenient means. The cradle 11 includes a pair of end frames 17 having upper container support members 19. The end member 17 are rigidly secured together by means of a back brace 21 and a generally V-shaped front brace 23. A container 25 is fitted on the support members 19 and a lashing strap 27 has one of its ends secured to the back brace 21 by means of a turn buckle 29. The other end of the strap 27 is connected to one side of a hydrostatic release device 31, the other side of which is secured to the V-shaped front brace 23 such as by a hook 33.

Within the container 25 but not shown, is a deflated raft having a gas operated inflating mechanism. Also within the container 25 is a major portion of a painter, one end of which 35 extends outside the container 25. The exposed portion of the painter 35 must be such as not to be affected by marine atmosphere, sunlight and the like. For instance, the portion 35 may be formed in a stainless steel wire rope with a thimble 37 secured at its end. The thimble 37 is connected to a U-shaped bail 39 welded or otherwise secured to the end member 17 through the dual breaking strength weak link 41, shown in more detail in FIG. 2.

The dual breaking strength weak link includes first and second bars 43 and 45 which are overlapped for a short section of their length and are secured together at that overlap by means of small rods 47 which are fitted through drilled holes 49 and 51 in the bars 43 and 45, respectively and held in place by welds 53 (see FIG. 3).

The free ends of the bars 43 and 45 carry shackles 55 and 57 which are secured to the bars 43 and 45 by means of screw pins 59. The shackles 55 and 57, in turn, cooperate with the bail 39 and thimble 37 to form universal joints which complete the connection between the painter 35 and the end member 17 of the cradle 11.

In order to provide accuracy and repeatability in the tension breaking strength of the dual breaking strength weak link, the holes 49 and 51 are first drilled in the bars 43 and 45. That side of the bars which forms the exit side for the drill is, in the usual method, deburred such as by counterdrilling. During the assembly of the bars 43 and 45 they are joined together in such a manner that the deburred side of the bar extends outward and forms a countersink area which may be conveniently used for locating the weld for the rods 47. However, more important than merely providing a location for the weld, placing the deburred section outwardly as shown particularly in FIG. 3 permits the bars 43 and 45 to be joined together in such a manner that the rod, at the interface of the two bars, maintains a close fit to the sides of the holes 49 and 51. By providing this close fit at the interface of the two bars accuracy of the breaking tension of the overall link is maintained. The reason for this accuracy is that the rods 47 being in close proximity to the sides of the holes 49 and 51 will be subjected to a force which is almost completely a sheer force rather than a partial tension force which would be the result if one or both of the deburring countersinks were located at the interface of the two bars. The partial tension force would, of course, vary considerably with but a slight variation in the depth of the countersink.

It is seen that since the link 41 is secured at both ends by universal joints including the shackles 55 and 57 on the one hand and the bail 39 and thimble 37 on the other, it will at all times lie in a position such that tension from the painter 35 will result in a complete tension force on the link 41 and consequently a sheer force against the rods 47.

In order to manually separate the weak link, the bars 43 and 45 are grasped and pivoted about a fulcrum formed by the end edge 61 of one of the bars. The end edge 61 being quite close to the rods 47, a great deal of leverage is obtained and the rods 47 easily broken in tension.

As a specific example of the weak link, the bars 43 and 45 may each be formed of a three and three quarter inch length of stainless steel flat bar stock, 3/16 inch by ¾ inch. The two bars are overlapped one quarter of an inch and the rods 47 placed in the center of the overlap such that the distance from the end edge 61 to the center line of the rods 47 is one eighth of an inch. The rods 47 may be formed of 0.058 inch diameter stainless steel rod having a nominal tensile breaking strength of 250 pounds.

I claim:

1. A weak link for securing a life raft painter to a vessel, said weak link comprising first and second bar members, said bar members being overlapped at their ends, rod means disposed through said bar members and securing them together at their overlapped ends, the distance between said rod means and the end edge of at least one of said bar members being short relative to the overall length of said one bar member whereby a high leverage may be obtained by pivoting said bar members about a fulcrum formed by said end edge to provide a low manual breaking strength while retaining a higher breaking strength for said weak link when subjected to tension force, and universal joint means secured at the opposite ends of said bar members whereby tension forces exerted on said universal joint means will result in a substantially pure tension force on the weak link.

2. A weak link as defined in claim 1 wherein said bar members each define through holes for receiving said rod means, the walls of said through holes at the interface of said bar members defining substantially a right angle with said interface, whereby tension forces exerted at said universal joint means will result in a substantially pure shear force on said rod means.

3. A weak link as defined in claim 1 wherein said through holes include an enlarged portion on those faces of the bar members remote from the interface thereof.

4. A weak link for securing a life raft painter to a vessel, said weak link comprising first and second bar members, said bar members being overlapped at their ends, rod means disposed through said bar members and securing them together at their overlapped ends, said rod means being the sole means of securing said bar members together against tension force exerted at their ends, the distance between said rod means and the end edge of at least one of said bar members being short relative to the overall length of said one bar member whereby a high leverage may be obtained by pivoting said bar members about a fulcrum formed by said end edge to provide a low manual breaking strength while retaining a higher breaking strength for said weak link when subjected to tension force, and universal joint means secured at the opposite ends of said bar members whereby tension forces exerted on said universal joint means will result in a substantially pure tension force on the weak link.

5. A weak link for securing a life raft painter to a vessel, said weak link comprising first and second bar members, said bar members being overlapped at their ends, rod means disposed through said bar members and securing them together at their overlapped ends, said rod means being the sole means of securing said bar members together against tension force exerted at their ends, said bar members defining through holes for receiving said rod means, the walls of said through holes at the interface of said bar members defining substantially a right angle at said interface, the dimensions of said rod means and said through holes providing a close fit at the interface of said bar members, the distance between said rod means and the end edge of at least one of said bar members being short relative to the overall length of said one bar member whereby a high leverage may be obtained by pivoting said bar members about a fulcrum formed by said end edge to provide a low manual breaking strength while retaining a higher breaking strength for said weak link when subjected to tension force and universal joint means secured at the opposite ends of said bar members whereby tension forces exerted at said universal joint means will result in a substantially pure tension force on the weak link and a substantially pure shear force on said rod means.

* * * * *